(12) United States Patent
Fang et al.

(10) Patent No.: US 7,979,244 B2
(45) Date of Patent: Jul. 12, 2011

(54) METHOD AND APPARATUS FOR APERTURE DETECTION OF 3D HEARING AID SHELLS

(75) Inventors: Tong Fang, Morganville, NJ (US); Alexander Zouhar, Hillsborough, NJ (US); Gozde Unal, West Windsor, NJ (US); Gregory G. Slabaugh, Princeton, NJ (US); Jason Jenn-Kwei Tyan, Princeton, NJ (US); Fred McBagonluri, East Windsor, NJ (US)

(73) Assignee: Siemens Corporation, Iselin, NJ (US)

( * ) Notice: Subject to any disclaimer, the term of this patent is extended or adjusted under 35 U.S.C. 154(b) by 1374 days.

(21) Appl. No.: 11/462,869

(22) Filed: Aug. 7, 2006

(65) Prior Publication Data

US 2007/0201713 A1 Aug. 30, 2007

Related U.S. Application Data

(60) Provisional application No. 60/723,850, filed on Oct. 5, 2005, provisional application No. 60/716,671, filed on Sep. 13, 2005, provisional application No. 60/723,849, filed on Oct. 5, 2005, provisional application No. 60/723,660, filed on Oct. 5, 2005.

(51) Int. Cl.
*G06F 7/60* (2006.01)
*G06K 9/00* (2006.01)
*G06T 15/00* (2011.01)

(52) U.S. Cl. ............................... 703/2; 382/128; 345/419
(58) Field of Classification Search ...... 703/2; 382/128; 345/419
See application file for complete search history.

(56) References Cited

U.S. PATENT DOCUMENTS

| | | | |
|---|---|---|---|
| 5,142,930 A | 9/1992 | Allen et al. | |
| 5,222,499 A | 6/1993 | Allen et al. | |
| 5,230,338 A | 7/1993 | Allen et al. | |
| 5,951,475 A | 9/1999 | Gueziec et al. | |
| 5,999,840 A | 12/1999 | Grimson et al. | |
| 6,096,050 A | 8/2000 | Audette | |
| 6,144,759 A | 11/2000 | Weese et al. | |
| 6,560,354 B1 | 5/2003 | Maurer et al. | |
| 7,328,080 B2 * | 2/2008 | Fu et al. ................... | 700/118 |
| 2004/0107080 A1 * | 6/2004 | Deichmann et al. .............. | 703/6 |
| 2004/0165740 A1 | 8/2004 | Fang et al. | |
| 2004/0165741 A1 | 8/2004 | Fang et al. | |
| 2004/0264724 A1 | 12/2004 | Fang et al. | |

OTHER PUBLICATIONS

Slabaugh et al., 3D Shape Modeling for Hearing Aid Design, Sep. 2008, IEEE Signal Processing Magazine, pp. 98-102.*

(Continued)

*Primary Examiner* — Paul Rodriguez
*Assistant Examiner* — Juan Ochoa

(57) ABSTRACT

A method identifying apertures of ear impressions is disclosed. A plurality of contour lines associated with an ear impression are determined and a difference value between a value of a characteristic, such as the diameter, of each contour line and that characteristic of an adjacent contour line is determined. The aperture is identified as being that contour line having the greatest difference value. The contour lines are determined by identifying where a plane intersects the surface of the graphical representations. In another embodiment, the contour lines are assigned a weight. A contour index is then calculated for each contour line as a function of the difference value and these weights. According to this embodiment, the aperture is identified as being a contour line that is adjacent to that contour line having the greatest contour index.

18 Claims, 8 Drawing Sheets

OTHER PUBLICATIONS

Michael Emmanuel Leventon; A Registration, Tracking, and Visualization System for Image-Guided Surgery; May 1997; Thesis Master of Science in Computer Science and Engineering at MIT; pp. 2 and 40-45.*

MATLAB Reference Guide, MATLAB version 4.0, Mathworks, 1992, p. 324.*

Audette, M.A., et al., "An Algorithmic Overview of Surface Registration Techniques for Medical Imaging", Medical Image Analysis, Oxford University Press, 1999.

Chui, H., et al., "A New Point Matching Algorithm for Non-Rigid Registration," in Proceedings of Computer Vision and Pattern Recognition, 2000, pp. 44-51.

Huang, X., et al., "Establishing Local Correspondences Towards Compact Representations of Anatomical Structures," in MICCAI, 2003, p. 926-934.

Paragios, N., et al., "Matching Distance Functions: A Shape-to-Area Variational Approach for Global-to-Local Registration," in ECCV, 2002, pp. 775-790.

Delingette, H., et al., "Shape Representation and Image Segmentation Using Deformable Surfaces," Image and Vision Comp., vol. 10, No. 3, pp. 132-144, 1992.

Hebert, M., et al., "A Spherical Representation for the Recognition of Free-Form Surfaces," IEEE Transactions on PAMI, vol. 17, No. 7, Jul. 1995.

Zhang, D., et al., "Harmonic Maps and Their Applications in Surface Matching," Proc. of IEEE Conference on Computer Vision and Pattern Recognition, 1999, vol. 2, pp. 524-530.

Johnson, A.E., et al., "Using Spin-Images for Efficient Object Recognition in Cluttered 3D Scenes," IEEE Transactions on PAMI, vol. 21, No. 5, pp. 433-449, 1999.

Solina, F., et al.,"Recovery of Parametric Models from Range Images:The Case for Superquadrics w/Global Deformations," IEEE Transactions on PAMI, vol. 12, No. 2, p. 131,1990.

Wu, K., et al., "Recovering Parametric Geons from Multiview Range Data," Proc. of IEEE Conference on Computer Vision and Pattern Recognition, pp. 159-166, 1994.

Basri, R., et al., "Determining the Similarity of Deformable Shapes," Proc. of ICCV Workshop on Physics-Based Modeling in Computer Vision, pp. 135-143, 1995.

Siddiqi, K., et al., "Shock Graphs and Shape Matching," Int'l Journal of Computer Vision, vol. 35, No. 1, pp. 13-32, 1999.

Bardinet, E., et al., "Structural Object Matching," Technical Report, Dept. of Computer Science and AI, Univ. of Granada, Spain 2000.

Bloomenthal, J., et al., "Skeletal Methods of Shape Manipulation," Shape Modeling and Applications, pp. 44-47, IEEE 1999.

D.W. Storti, et al., "Skeleton-Based Modeling Operations on Solids," Solid Modeling, pp. 141-154, 1997.

Brennecke, A., et al., "3D Shape Matching Using Skeleton Graphs," Simulation and Visualization, 2004.

Maintz, J.B.A., et al., "A Survey of Medical Image Registration," Medical Image Analysis, vol. 2, No. 1, pp. 1-36, 1998.

Besl, P.J., et al., "A Method for Registration of 3-D Shapes," IEEE Trans. on PAMI, vol. 14, No. 2, pp. 239-256, 1992.

Rusinkiewicz, S., et.al., "Efficient Variants of the ICP Algorithm," in Proceedings of the Third Intl. Conf. on 3-D Digital Imaging and Modeling, 2001, pp. 1-8.

Horn, B.K.P., "Closed-Form Solution of Absolute Orientation Using Unit Quaternions," J. of Optical Soc. of Amer., vol. 4, p. 629, Apr. 1987.

Zouhar, A., et al., "Anatomically-Aware, Automatic, and Fast Registration of 3D Ear Impression Models," 3rd Intl Symp. on 3D Data Proc. Visual & Trans. (3DPVT) 2006.

Osada, R., et al., "Matching 3D Models with Shape Distributions," Proc. of International Conference on Shape Modeling & Applications, 2001, p. 154.

Srihari, et al., "Representation of Three-Dimensional Digital Images," Computing Surveys, vol. 13, No. 4, 1981.

Yamany, S. M., et al., "Novel Surface Registration Using the Grid Closest Point (GCP) Transform," IEEE Int'l Conf. on Image Processing, ICIP '98, vol. 3, pp. 809-813,1998.

Grenness et al., "Mapping ear canal movement using area-based surface matching", The Journal of Acoustical Society of America, American Institute of Physics for the Acoustical Society of America, New York, NY, vol. 111, No. 2, Feb. 1, 2002, pp. 960-971.

Trahanias, "Binary Shape Recognition Using the Morphological Skeleton Transform", Nov. 1, 1992, Pattern Recognition, Elsevier, GB, pp. 1277-1288.

European Search Report dated Nov. 19, 2010.

* cited by examiner

METHOD AND APPARATUS FOR APERTURE DETECTION OF 3D HEARING AID SHELLS

This patent application claims the benefit of U.S. Provisional Application No. 60/723,850, filed Oct. 5, 2005, which is hereby incorporated by reference herein in its entirety.

CROSS-REFERENCE TO RELATED APPLICATIONS

The present application is also related to U.S. Patent Application Ser. No. 60/716,671., titled Method and Apparatus for the Registration of 3D Ear Impression Models; U.S. Patent Application Ser. No. 60/723,849, titled Method and Apparatus for the Rigid Registration of 3D Ear Impression Shapes with Skeletons; and U.S. Patent Application Ser. No. 60/723,660, titled Method and Apparatus for the Rigid and Non-Rigid Registration of 3D Shapes, all of which are being filed simultaneously herewith and are hereby incorporated by reference herein in their entirety.

BACKGROUND OF THE INVENTION

The present invention relates generally to the feature extraction from three-dimensional objects and, more particularly, from three-dimensional ear impression models.

The manufacturing of medical devices designed to conform to anatomical shapes, such as hearing aids, has traditionally been a manually intensive process due to the complexity of the shape of the devices. FIG. 1A shows a diagram of a human ear that is, for example, the ear of a patient requiring a hearing aid. Specifically, ear 100 has various identifiable parts such as, for example, aperture 102, crus 103, canal 104, concha 105 and cymba 106. As one skilled in the art will recognize, in order to produce a hearing aid for the patient, an ear impression is typically taken. Various processes for taking such ear impressions have been developed, but most such processes typically involve inserting a pliable material into an ear and allowing that material to harden so that, when it is removed, the contours of the different parts of the ear, such as parts 102-106 of FIG. 1A, are accurately reflected on the impression. Such an ear impression reflecting the parts of ear 100 of FIG. 1A is shown in FIG. 1B. More particularly, ear impression 101 has aperture portion 102A corresponding to aperture 102 of FIG. 1A; crus portion 103A corresponding to crus 103 of FIG. 1A; canal portion 104A corresponding to canal 104 in FIG. 1A; concha portion 105A corresponding to concha 105 of FIG. 1A; cymba portion 106A corresponding to cymba 106; and lower body portion 107A.

Different methods have been used to create ear molds, or shells, from ear impressions. One skilled in the art will recognize that the terms ear mold and ear shell are used interchangeably and refer to the housing that is designed to be inserted into an ear and which contains the electronics of a hearing aid. Traditional methods of manufacturing such hearing aid shells typically require significant manual processing to fit the hearing aid to a patient's ear by, for example, sanding or otherwise removing material from the shell in order to permit it to conform better to the patient's ear. More recently, however, attempts have been made to create more automated manufacturing methods for hearing aid shells. In some such attempts, ear impressions are digitized and then entered into a computer for processing and editing. The result is a digitized model of the ear impressions that can then be digitally manipulated. One way of obtaining such a digitized model uses a three-dimensional laser scanner, which is well known in the art, to scan the surface of the impression both horizontally and vertically. The result of such scanning is a digitized model of the ear impression having a plurality of points, referred to herein as a point cloud representation, forming a graphical image of the impression in three-dimensional space. FIG. 2 shows an illustrative point cloud graphical representation 201 of the hearing aid impression 101 of FIG. 1B. As one skilled in the art will recognize, the number of points in this graphical point cloud representation is directly proportional to the resolution of the laser scanning process used to scan the impression. For example, such scanning may produce a point cloud representation of a typical ear impression that has 30,000 points.

Once such a digitized model of an ear shell has been thus created, then various computer-based software tools may have been used to manually edit the graphical shape of each ear impression individually to, for example, create a model of a desired type of hearing aid for that ear. As one skilled in the art will recognize, such types of hearing aids may include in-the-ear (ITE) hearing aids, in-the-canal (ITC) hearing aids, completely-in-the-canal (CIC) hearing aids and other types of hearing aids. Each type of hearing aid requires different editing of the graphical model in order to create an image of a desired hearing aid shell size and shape according to various requirements. These requirements may originate from a physician, from the size of the electronic hearing aid components to be inserted into the shell or, alternatively, may originate from a patient's desire for specific aesthetic and ergonomic properties.

Once the desired three-dimensional hearing aid shell design is obtained, various computer-controlled manufacturing methods, such as well known lithographic or laser-based manufacturing methods, are then used to manufacture a physical hearing aid shell conforming to the edited design out of a desired shell material such as, for example, a biocompatible polymer material.

SUMMARY OF THE INVENTION

The present inventors have recognized that, while the aforementioned methods for designing hearing aid shells are advantageous in many regards, they are also disadvantageous in some aspects. In particular, prior attempts at computer-assisted hearing aid manufacturing typically treat each ear mold individually, requiring the manual processing of digitized representations of individual ear impressions. Such attempts have typically relied on the manual identification of the various features of an ear impression and individual editing of the graphical model of each ear impression. However, the present inventors have recognized that it is desirable to be able to process in an automated fashion two ear molds corresponding to, for example, each ear of a patient, together in order to decrease the time required to design the hearing aid molds.

Accordingly, the present inventors have invented an improved method of designing hearing aid molds whereby two shapes corresponding to graphical images of ear impressions are registered with each other to facilitate joint processing of the hearing aid design. In particular, the present inventors have invented an improved method of designing hearing aid molds whereby apertures of ear impressions are identified which could be useful for applications such as registering the graphical representations of a plurality of hearing aid impressions and automatic detailing of hearing aid impressions. In a first embodiment, a plurality of contour lines associated with an ear impression are determined and a difference value is determined between a value of a characteristic, such as the diameter, of each contour line and that characteristic of an adjacent contour line. The aperture is identified as being that contour line having the maximum value of that difference value. In a second embodiment, the contour lines are determined by orienting a graphical representation of the ear impression in a desired orientation, such as vertically in three-dimensional space. Then, a plane, such as a horizontal plane, is caused to intersect with the graphical representation at different levels. Contour lines are determined by identifying where the plane intersects the surface of the graphical representation. In yet another embodiment, the contour lines are assigned a weight according to the positions of those contour lines relative to the graphical representation. A contour index is then calculated for each contour line as a function of a difference value and these weights. According to this embodiment, the aperture is identified as being a contour line that is adjacent to that contour line having the greatest contour index.

These and other advantages of the invention will be apparent to those of ordinary skill in the art by reference to the following detailed description and the accompanying drawings.

DETAILED DESCRIPTION

Figure 1A:
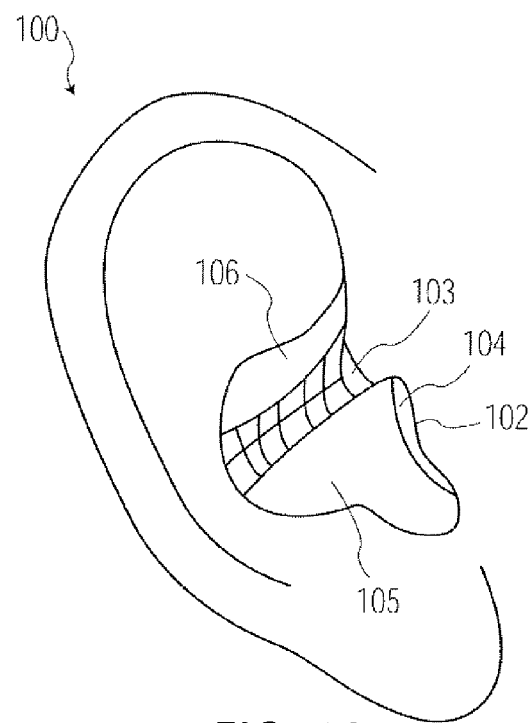
FIG. 1A shows a graphical depiction of an ear of a patient to be fitted with a hearing aid.

The present inventors have recognized that it is desirable to use registration techniques to align two ear impressions with each other, for example the ear impressions of both ears of a patient, in order to improve the design process of hearing aid shells. Registration of two different surfaces is a fundamental task with numerous potential applications in various fields. As is well known and as used herein, registration is generally defined as the alignment of two surfaces through the use of various three-dimensional transformation techniques, such as, for example, three dimensional surface rotation and translation. Registration typically involves aligning two shapes in such a way as to allow the comparison of the shapes to, for example, identify similarities and differences between those shapes. While such registration is a fundamental technique and can be very useful, the registration of two complex three-dimensional (3D) shapes, such as shapes formed by ear impressions used in the manufacture of hearing aids, is not trivial. In fact, in such cases, registration may be very computationally and practically difficult. Prior registration attempts in various fields have typically represented shapes to be registered using point-based, feature-based or model-based methods. As one skilled in the art will recognize, point-based methods model a surface by representing that surface using a number of points. For example, as discussed above, a typical representation of an ear impression may consist of 30,000 such points on the surface to be registered. Then, various calculations are made to align each point on one surface with a corresponding point on another surface. Model-based registration methods, on the other hand use statistical modeling methods, instead of surface points, to describe the surfaces of a shape.

Such prior point-based and model-based registration methods typically do not attempt to simplify the representation of the surface to a more compact description of that surface (i.e., to reduce the amount of information that requires processing during registration) but, instead, use all or a large subset of all the points on the surface to describe a shape. Thus, these methods are very computationally intensive.

Feature-based methods, on the other hand, are useful for reducing the amount of information used to register two shapes. Such methods typically represent different landmarks or features of a shape as lower dimensional shapes, such as cylinders, quadrics, geons, skeletons and other such simplified geometric shapes. In such attempts, these landmarks or features on a surface are typically identified manually which increases the time required to perform the registration process. In addition, such attempts are typically not consistently repeatable due to the subjective nature of manually identifying simple shapes. Finally, as one skilled in the art will recognize, feature-based registration methods are further limited because the use of such simplified shapes typically leads to relatively rough registration results.

Therefore, the present inventors have recognized that, instead of using prior point, model or feature-based registration methods, it is desirable to perform the registration of ear impressions using actual anatomic regions to align two impressions. In particular, the present inventors have recognized that it is desirable to use the aperture regions of two ear impressions of a patient (e.g., the impressions of the left and right ears of the patient) in order to register those ear impressions with each other. Such a registration is desirable since the location of the two apertures of the patient (corresponding to each ear) are fixed in position relative to one another and also closely correspond in size and shape with each other for any particular individual. Thus, by using the aperture to register the two ear impressions, various editing operations may be used as described above to remove or reshape the different surfaces of both ear impressions simultaneously in order to create a model of an ear shell.

Figure 2:
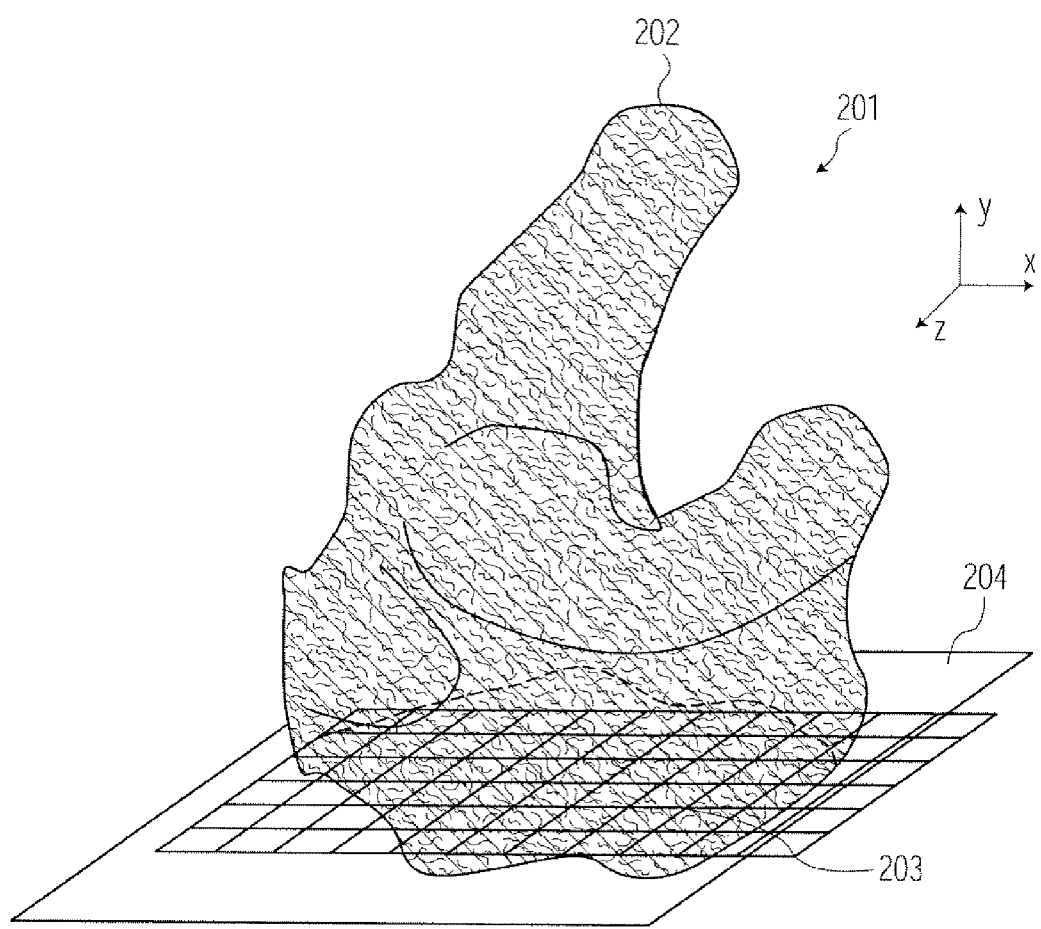
FIG. 2 shows a point cloud representation of the ear impression of FIG. 1B.

However, in order to be able to use anatomical regions, such as the aperture, for registration purposes, those regions must first be identified on each impression. One skilled in the art will recognize that various methods of identifying regions of an ear impression are possible, such as the manual selection of those regions prior to registration. In accordance with an embodiment of the present invention, anatomical regions of a point cloud representation of an ear impression are automatically identified. Referring once again to FIG. 2, in order to accomplish such automatic identification according to this embodiment, the point cloud representation 201 of the impression is first oriented such that the tip 202 of the impression is oriented vertically as the highest portion of the point cloud representation 201 and the base 203 of the impression is oriented on plane 204 as the lowest portion of the point cloud representation. It will be obvious to one skilled in the art how to achieve such an orientation of a point cloud representation. For example, during laser scanning, typically the base 203 of the ear impression is not actually scanned since the base portion of any resulting ear mold does not have to conform to any anatomical region. As a result, the base of a scanned impression is typically represented as an opening in the bottom area of the point cloud representation of the ear impression. This may be accomplished, for example, by using well-known principle component analysis techniques to align this opening with plane 204. It will also be obvious to one skilled in the art in light of the teachings herein that various other orientations, other than a vertical orientation, may be used with equally advantageous results.

Figure 3:
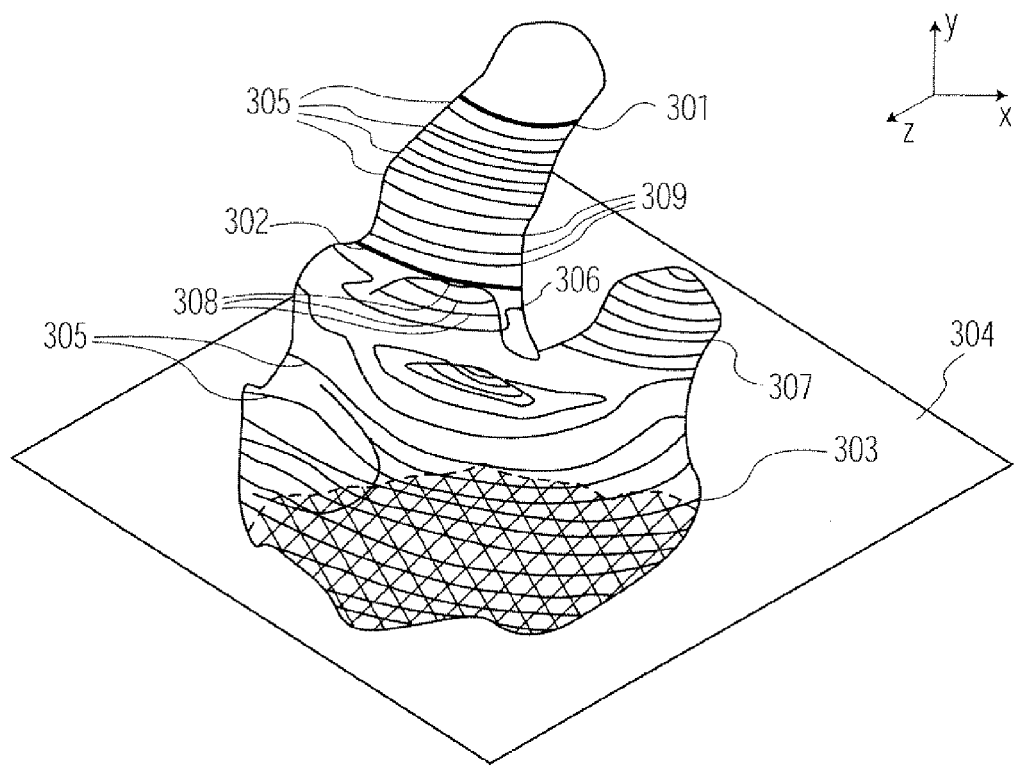
FIG. 3 shows a graphical point cloud representation in accordance with an embodiment of the present invention whereby a plurality of horizontal slices are obtained by intersecting a horizontal plane with the representation of FIG. 2.
Figure 4:
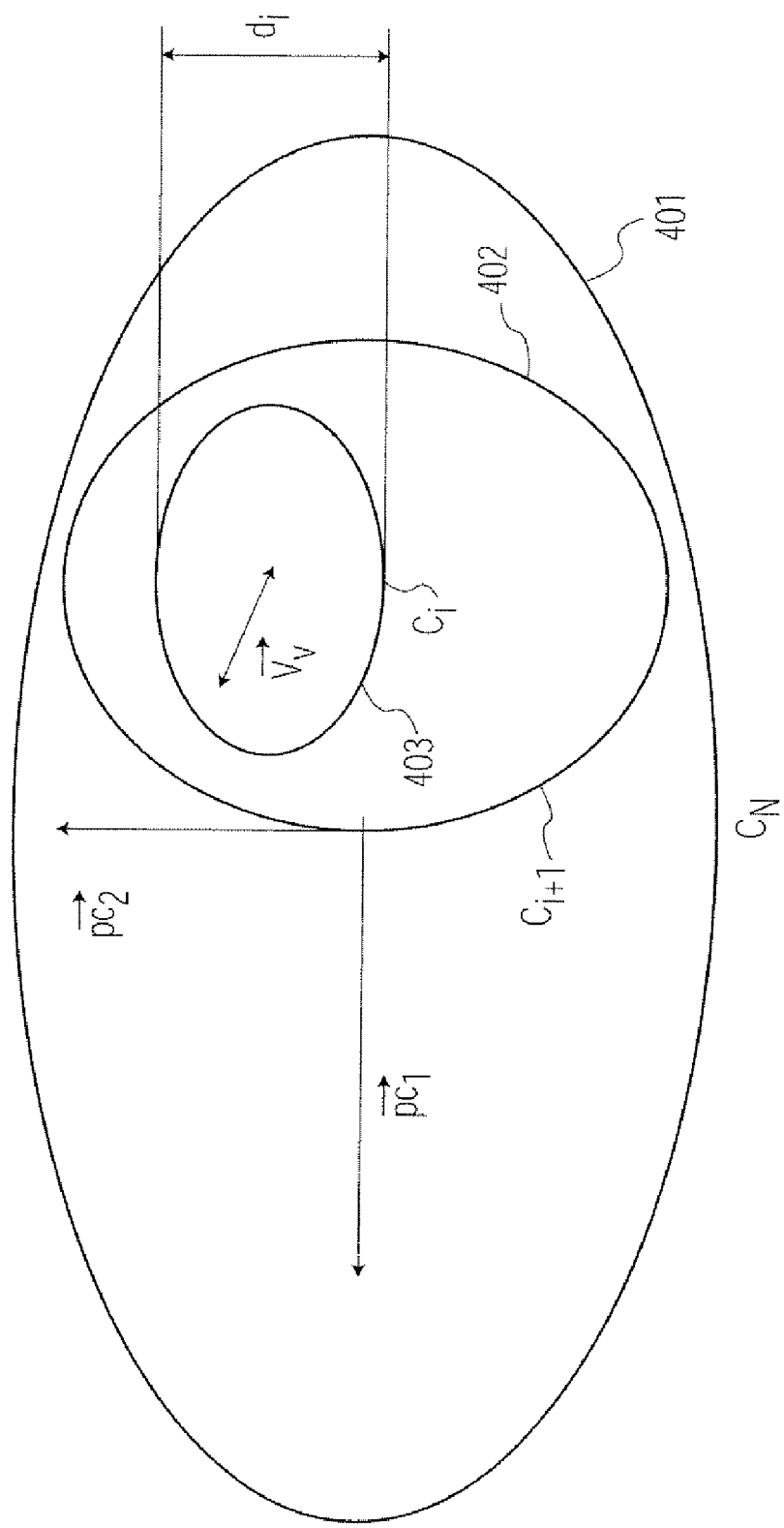
FIG. 4 shows contour lines in accordance with an embodiment of the present invention representing the intersection of an illustrative point cloud representation surface with a horizontal plane at different levels of the representation.

Next, according to this embodiment, once the ear impression has been vertically oriented, a plurality of horizontal slices are taken of the point cloud representation. These slices are taken, for example, by moving a horizontal plane, such as plane 204, down the point cloud representation along the y-axis from the canal tip area 202 of FIG. 2 towards the base area 203 of FIG. 2 and identifying the intersection of that plane with the surface of the point cloud representation 201. Such an intersection of a plane with the surface of the point cloud representation 201 will result in one or more contour lines on that plane. FIG. 3 shows how a horizontal plane 304 will intersect the ear impression to create slices 305 in the point cloud representation. FIG. 4, discussed further herein below, shows a view of three illustrative contour lines 401, 402 and 403 corresponding to slices 303, 306 and 302 of FIG. 3, respectively. Contour lines 401, 402 and 403 are merely representative in nature and one skilled in the art will recognize that such contour lines will typically be more complex shapes than the oval shapes of FIG. 4.

Depending on the distance between the horizontal slices, there may be more than one contour line at a particular level representing two different intersections of the point cloud representation with a particular horizontal plane. For example, referring again to FIG. 3, contour line 306 on the canal and concha portion of the point cloud representation and contour line 307 on the cymba portion of the representation may be obtained from a single slice taken with a particular horizontal plane. Similarly, contour lines 308 on the concha portion of the point cloud representation may be obtained from the same slices that produced contour lines 309 on the canal portion of the representation. Such multiple slices occur when the horizontal plane at the particular level intersects different portions of the point cloud representation of the ear impression corresponding to different anatomical regions of an ear.

Figure 1B:
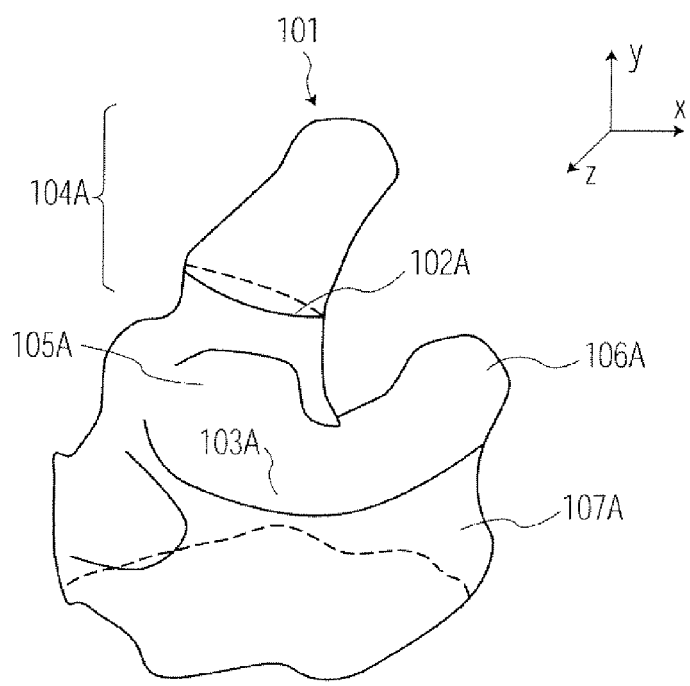
FIG. 1B shows a prior art ear impression taken of the ear of FIG. 1A.

In order to identify a particular anatomical region, in this case the aperture, any multiple slices must be resolved by removing any contour lines not corresponding, in this case, to the aperture, canal and lower body portions of the point cloud representation of the ear impression. Since these different regions, as discussed in association with FIGS. 1A and 1B, are clearly identifiable, it is possible to select and remove from consideration any contour lines not corresponding to the aperture and canal portions. Such selection and removal may be accomplished, for example, automatically on a computer, discussed further herein below, running appropriate software for the graphical editing of the point cloud representation and contour lines. Such a selection and removal may be accomplished automatically by, for example, calculating the center of each contour line and, when multiple contour lines are present at a given level, only using that contour line having a center closest to the center of the immediately preceding contour line. Alternatively, such selection and removal may be accomplished manually by, for example, using a mouse and computer pointer to select contour lines for removal. Once the contour lines not corresponding to the canal/aperture and lower body portions of the point cloud representation have been removed, the result is what is referred to herein as an aperture profile that consists of contour lines corresponding only to the canal/aperture and lower body portions of the point cloud representation.

Once the aperture profile of contour lines has been identified, in accordance with an embodiment of the present invention, the aperture portion of the point cloud representation may be automatically identified. In particular, in accordance with this embodiment, a filter rule is calculated to extract an aperture profile function whose maximum value defines the actual aperture contour line on the point cloud representation of the ear impression. Specifically, such a filter rule can be defined by the expression:

$$val_i = f_i * (d_i - d_{i-1}), \quad f_i = 1 - \frac{i}{N}, \quad 2 \le i \le N \quad \text{(Equation 1)}$$

$$pos = \arg\max_i = (val_i) - 1, \quad 1 \le pos \le N - 1 \quad \text{(Equation 2)}$$

where $val_i$ is the contour line index for contour line i, pos is the contour line to be identified as the aperture, N is the number of contour lines, $d_i - d_{i-1}$ is the difference between the diameters of the i and the i−1 contour lines, and $f_i$ is a weighting factor, discussed herein below, applied to contour line i. As discussed above, FIG. 4 shows a schematic top view of aperture profile contour lines in which contour line 401 represents contour line 303 of FIG. 3, contour line 402 represents contour line 306 of FIG. 3 and contour line 403 represents contour line 302 of FIG. 3. Points of each contour line i are considered as vectors $\vec{v}_{ij}$ originating from the center of that contour line. The term $d_i$ represents the difference between the two maximum projection values of these vectors onto the second principal component $\vec{p}c_2$ of the lowest contour line $c_N$. Accordingly, one may anticipate that the value of $d_i - d_{i-1}$ alone has its maximum value at the aperture contour line, such as at contour line 302 in FIG. 3 corresponding to contour line 402 in FIG. 4.

However, the present inventors have recognized that using $d_i - d_{i-1}$ alone may not be sufficient to identify the aperture of the point cloud representation of the ear impression in all cases. In particular, ear impressions exhibiting a shallow concha may be misclassified. In such cases contours below the expected aperture may be mistakenly identified as the aperture. Accordingly, as shown in Equation 1, the values of $d_i - d_{i-1}$ are weighted with factor $f_i$ which has the effect of assigning a higher importance to the canal region. Factor $f_i$ is calculated as described in the second line of Equation 1 and decreases the weight applied to each successive contour line as the distance of the contour line from the canal portion of the point cloud representation increases.

Figure 5:
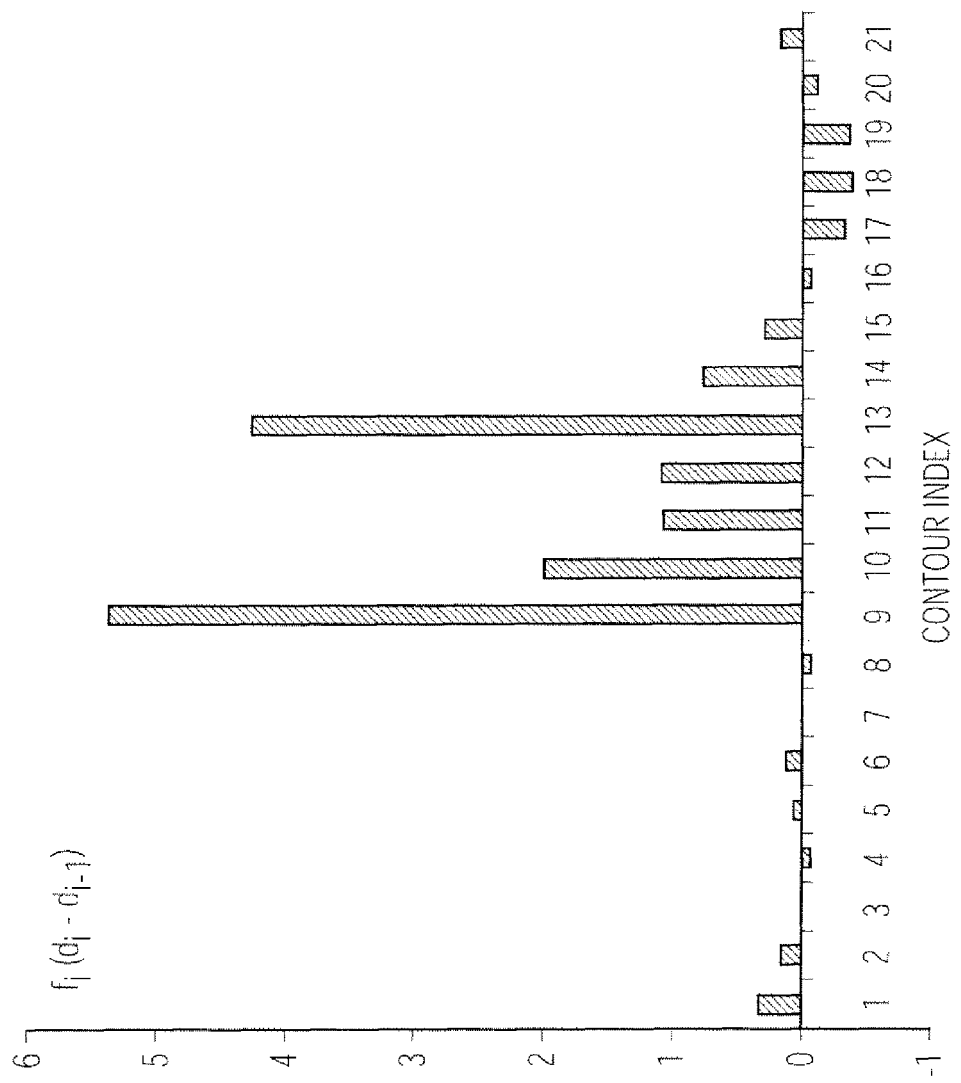
FIG. 5 shows a graphical depiction of how a contour index is used to identify an aperture of an ear impression in accordance with an embodiment of the present invention.

FIG. 5 shows a graph of the values of Equation 1 calculated for each contour line 305 of FIG. 3. Referring to that figure, the contour line with contour index 1 corresponds to scan line 301 in FIG. 3, the contour line with contour index 9 corresponds to contour line 302 in FIG. 3 and the contour line with contour index 21 corresponds to contour line 303 in FIG. 3. The remaining contour index values corresponding to the contour lines 305 shown in FIG. 3. Equation 2 determines the actual aperture by determining the contour line having the maximum value of the contour index of Equation 1 and then identifying the contour line immediately preceding that maximum value contour line. Thus, according to the foregoing method, the aperture of the ear impression can be identified for each impression to be registered Once again, this method is merely illustrative in nature and one skilled in the art will recognize in light of the teachings herein that many suitable methods for identifying an aperture or other region of a point cloud representation of ear impressions, such as manually identifying such a region, can be used with advantageous results.

Once the aperture of the ear impression has been identified, in accordance with another embodiment of the present invention, in order to register two ear impressions having such identified apertures, a denser set of points corresponding to, for example, the canal, aperture, and concha portions of the point cloud representation of the ear impression is used to increase the accuracy of the hearing aid shell design. Such a denser set of points from these areas is desirable since these are the regions to which the hearing aid device will ultimately be fit in a patient's ear. The present inventors have recognized that, in accordance this embodiment, it is not desirable to include points in this denser set of points from the cymba, canal tip or lower body regions to register the two ear impressions since these areas are typically removed during the hearing aid manufacturing process. Thus, removing these points from the denser set of points reduces computational complexity of the registration process. As one skilled in the art will recognize in light of the teachings herein, detection of the cymba is possible by detecting topological variations of the contour of the surface of the point cloud representation as occur between, for example, the canal and cymba portions of the ear impression. However, the present inventors have recognized that such variations are not always readily apparent. Thus, in order to identify portions of the point cloud representation from which points can be removed from consideration during registration, in accordance with another embodiment, a reference point $p_r$ is identified that is known to be located in one or more of these regions, such as the cymba 106A in FIG. 1B:

$$p_r = \arg\max_{p \in P}\left[\frac{p-c}{\|p-c\|} * x * \|p-c\|\right], \quad \|x\| = 1 \quad \text{(Equation 3)}$$

where $p_r$ is a reference point definitely located in the cymba 106A region, P is the set of all contour points, c is the center point of the aperture contour and x is the x-axis of the local coordinate frame which is oriented from concha 105A to cymba 106A. As one skilled in the art will recognize, the expression $\|p-c\|$ ensures that Equation 3 will favor points of, for example, the cymba 106A region to be removed and the expression $[(p-c)/(\|p-c\|)]\cdot x$ provides a directional constraint which gives a higher weight to the points on the surface of the cymba 106A.

Figure 6:
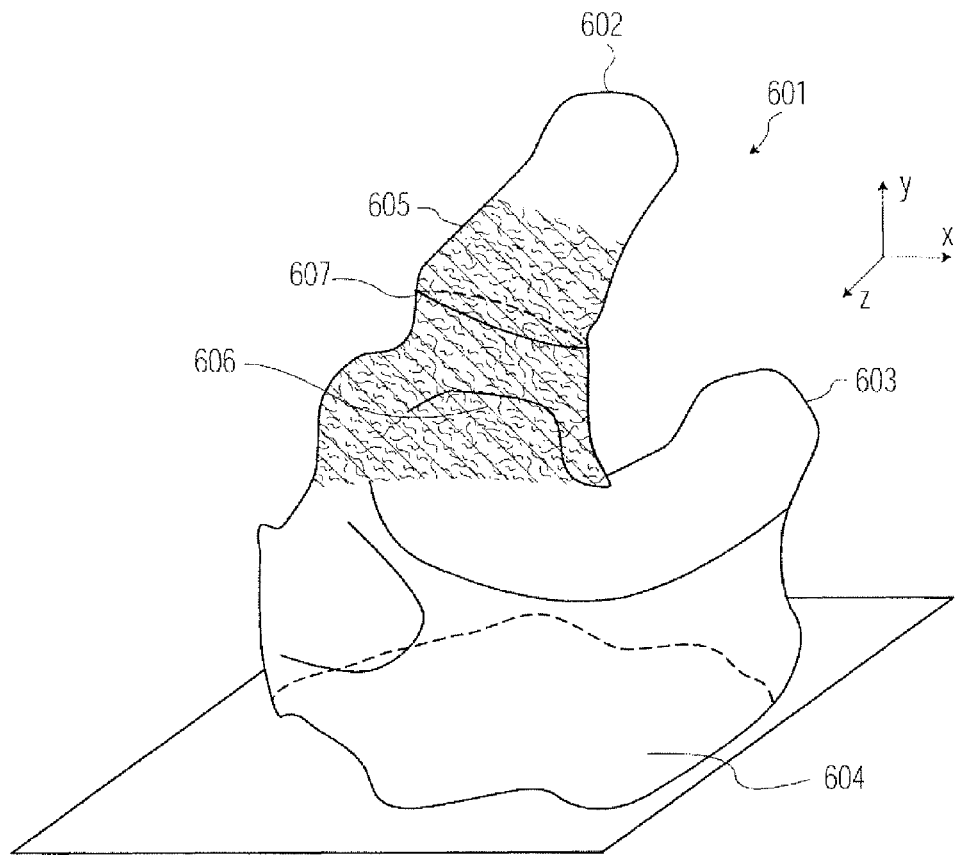
FIG. 6 shows a reduced set of points in a point cloud representation of an ear impression in accordance with an embodiment of the present invention.

Thus, according to Equation 3, only those points that are closer to the aperture center than $p_r$ are retained, resulting in a set of points p that primarily belong to canal 104A, aperture 102A, and concha 105A regions. Similar calculations may be performed for other areas from which points in the point cloud representation are to be removed. Additionally, points below a desired point on the y-axis of the point cloud representation, corresponding with a portion of the lower body of the representation, may also be removed. FIG. 6 shows such a resulting illustrative set of points of a point cloud representation 601 of an ear impression whereby the points corresponding to the cymba portion 603, the canal tip portion 602 and the lower body have been removed. Accordingly, only points corresponding to the canal region 605, aperture region 607 and concha region 606 remain. Illustratively, this point set may consist of approximately 200 points, which is a very compact shape representation when compared to the original input point set with approximately 30,000 points and when compared to the number of points typically used in prior registration attempts.

Figure 7:
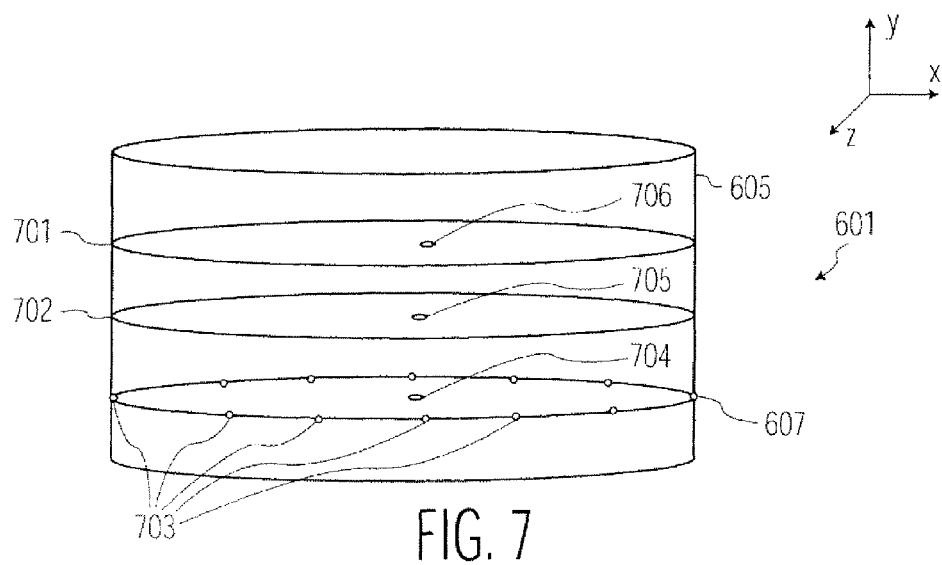
FIG. 7 shows a close up view of the aperture area of a point cloud representation of an ear impression in accordance with an embodiment of the present invention.

Once the aforementioned set of points corresponding to only the canal, aperture and concha regions of two ear impressions have been identified, correspondences between the points related to the apertures of those ear impressions, must be determined in order to register the two impressions. In particular in order to find the best pair-wise correspondences between two sets of aperture points, it is necessary to consider the relation of these points to the global surface. Specifically, a local coordinate system is defined as shown in FIG. 6 for each of the ear impressions. The y-axis of the coordinate system is defined as being normal to the horizontal cutting plane 604, discussed herein above and the y-axis is assumed to be off the center of mass. The x-direction represents the main orientation of the horizontal direction from canal 605 to cymba 603 and the second major direction defines the z-axis which points in the horizontal direction from canal 605 to concha 606. This coordinate system is used to extract the reduced set of feature points from the aperture contour in a defined order. The set of aperture points may be defined to be any suitable number of points that adequately define the shape and orientation of the aperture in sufficient detail that pair-wise correspondences between two sets of such points (e.g., corresponding to the apertures of two different ears of a patient). In one illustrative embodiment, the set of points corresponding to the aperture consists of 16 equally-spaced aperture points along the aperture contour line 607 of FIG. 6 plus three additional points: the aperture center point and the center points of two canal contour lines above the aperture contour. FIG. 7 shows a more detailed view of these points. In particular, FIG. 7 shows the portion of ear impression 601 of FIG. 6 and the aperture contour line 607 and part of the canal portion 605. More particularly, FIG. 7 shows the illustrative 16 points 703 along the aperture contour line 607, as well as the center point 704 of that aperture contour line and the center points 705 and 706 of the two contour lines 701 and 702 immediately above the aperture contour line. One skilled in the art will recognize in light of the foregoing that the resulting points identify an aperture vector in that they define the shape and orientation of an ear impression aperture to be registered. One skilled in the art will also recognize that other methods of identifying the shape and orientation of the aperture are possible with equally advantageous results.

Once the apertures of two ear impressions have been thus characterized as a vector, registration can be accomplished by estimating the six registration parameters necessary to map one aperture vector, denoted vector $A_1$, to another aperture vector, denoted vector $A_2$. These six registration parameters correspond to three-dimensional translation T parameters and three-dimensional rotation R parameters. As one skilled in the art will recognize, such parameters identify the necessary translations along the x, y and z axes, and the three-dimensional rotations about those axes, respectively, that are necessary to map one of the aperture vectors onto the second aperture vector. One skilled in the art will recognize that, while the present embodiment uses a particular rigid registration technique, explained herein below, other registration techniques using, for example, well-known closed form solutions or Newton methods on the energy function also be utilized to solve for the rigid registration parameters with equally advantageous results. In particular, using such parameters, it is possible to identify an energy function to penalize a distance measurement $L^2$. Measurement $L^2$ represents the square of the distances between corresponding points of the two aperture vectors to be registered, and that approaches zero as the second vector $A_2$ approaches alignment with the first vector $A_1$. Such an energy function can illustratively be defined by the expression:

$$E(R,T) = \|A_1 - (R*A_2+T)\|^2 \quad \text{(Equation 4)}$$

The aperture points can be represented as a set of 3D points such that vector $A_1 = [P_1, P_2, \ldots, P_n]$ and vector $A_2 = [Q_1, Q_2, \ldots, Q_n]$, where n is the number of points in each set of points in the respective aperture vector. Accordingly, Equation 4 becomes:

$$E = \sum_{i=1}^{n} \|P_i - (R*Q_i + T)\|^2 \quad \text{(Equation 5)}$$

Then, the first variation of Equation 5 with regard to the translation parameters $T^k$, $k=1, \ldots, 3$ is given by the expression:

$$\frac{\partial T^k}{\partial t} = \sum_{i=1}^{n} < [P_i - (R*Q_i + T)], \frac{\partial T}{\partial T^k} > \quad \text{(Equation 6)}$$

where $$\frac{\partial T}{\partial T^1} = \begin{pmatrix} 1 \\ 0 \\ 0 \end{pmatrix}, \frac{\partial T}{\partial T^2} = \begin{pmatrix} 0 \\ 1 \\ 0 \end{pmatrix}, \frac{\partial T}{\partial T^3} = \begin{pmatrix} 0 \\ 0 \\ 1 \end{pmatrix}$$

and $<\square, \square>$ denotes an inner product in 3D Euclidean space.

In accordance with another embodiment, in order to define rotation of the aperture set in 3D, we use exponential coordinates, also known in the art as twist coordinates, where a 3D vector $w = (w_1, w_2, w_3)$ represents the rotation matrix. Using the 3D w vector, one skilled in the art will recognize that it is possible to perform various operations, such as taking the derivations of the rotations for the 3D translation vector T. A skew symmetric matrix corresponding to w can then be given by the expression:

$$\hat{w} = \begin{bmatrix} 0 & -w_3 & w_2 \\ w_3 & 0 & -w_1 \\ -w_2 & w_1 & 0 \end{bmatrix}$$

and the rotation matrix can be defined by $R = e^{\hat{w}}$. Then the first variation of Equation 5 with regard to rotation parameters is given by the expression:

$$\frac{\partial w^k}{\partial t} = \sum_{i=1}^{n} < [P_i - (R*Q_i + T)], R * \frac{\partial \hat{w}}{\partial w^k} Q_i > \quad \text{(Equation 7)}$$

where $$\frac{\partial \hat{w}}{\partial w^1} Q_i = \begin{pmatrix} 0 \\ -Z_i \\ Y_1 \end{pmatrix}, \frac{\partial \hat{w}}{\partial w^2} Q_i = \begin{pmatrix} Z_i \\ 0 \\ -X_i \end{pmatrix}, \frac{\partial \hat{w}}{\partial w^3} Q_i = \begin{pmatrix} -Y_i \\ X_i \\ 0 \end{pmatrix}$$

One skilled in the art will note that, as an initial condition for Equations 6-8, it is assumed $T_1 = 0$, $T_2 = 0$, $T_3 = 0$, and similarly, $w_1 = 0$, $w_2 = 0$, $w_3 = 0$, which is equivalent to $R = I$ (an identity matrix). Each time $w = (w_1, w_2, w_3)$ is updated, a new rotation matrix can be computed as:

$$R = \cos(t)I + \sin(t)\hat{w}^* + (1 - \cos(t))w^* w^{*T}$$

where $t = \|w\|$, and $w^* = w/t$. As one skilled in the art will recognize, a gradient descent method, well known in the art, can be used with momentum in order to optimize the motion parameters.

Since such an alignment method described herein above performs registration on a reduced set of aperture points, it is fast and provides an excellent initial registration result. One skilled in the art will recognize that it would be possible to adapt the foregoing approach to refine this registration using more points of the point cloud representations. However, such a refined registration process would introduce significant delay and processing requirements into the initial registration process. Therefore, in accordance with another embodiment of the present invention, after the apertures are aligned using the approach described herein above, the alignment is refined by performing dense surface registration using the well-known Grid Closest Point (GCP) algorithm, which does not require explicit correspondences between each of the points on the surface to be calculated. The GCP algorithm is also well known in the art and, therefore, will not be discussed further herein other than is necessary for the understanding of the embodiments of the present invention. A more detailed discussion of this well-known algorithm can be found in S. M. Yamany, M. N. Ahmed, E. E. Hemayed, and A. A. Farag, "Novel surface registration using the grid closest point (GCP) transform," *ICIP '98*, vol. 3, 1998, which is incorporated by reference herein in its entirety. If explicit correspondences can be established, a similar situation exists as in the above case and, therefore, it is not necessary to limit the present embodiment to an iterative solution for registration. Rather, well-known closed form solutions or Newton methods on the energy function can also be utilized to solve for the rigid registration parameters.

As one skilled in the art will recognize, the GCP algorithm works well in practice to refine registration results and is exceptionally fast. In order to perform this refined registration, the dense point sets (of, for example and as discussed above, 200 points) for each point cloud representation are denoted as P (corresponding to the first, transformed point cloud representation) and M (corresponding to the second point cloud representation), respectively. According to this algorithm, considering a rotation matrix R and a translation T as described herein above, the transformed points of data set P are given by:

$$p_i(R,T) = Rp_i + T, 1 \leq i \leq N \quad \text{(Equation 8)}$$

In order to refine the initial registration obtained above, it is desirable to minimize the sum of the squared individual distances $E^i$ between the corresponding points between set P and set M according to the expression:

$$E = \sum_{i=1}^{N} E^i \quad \text{(Equation 9)}$$

$$E^i = \left\| \arg\min_{m \in M} \left\| m - p_i(R, T) \right\| - p_i(R, T) \right\|^2 \quad \text{(Equation 10)}$$

Hence, according to Equations 9 and 10, it is possible to determine the rotation and translation parameters (R, T) that minimize the sum of the least N squared individual distances $E^i = d_i^2$ (R, T) between each point in the set of points on the surfaces of the point cloud representations. One skilled in the art will recognize that, as discussed above, it may be desirable to tune the results of the foregoing refined registration method by weighting points in one or more of the data sets according to their positions on the surfaces of the ear impression. Specifically, greater weights may be illustratively assigned to points associated with the aperture 102A, concha 105A, and canal 106A regions of FIG. 1B using, illustratively, a step function that rejects points not belonging to these portions of the ear impression. In this way, other portions of the ear impression will not bias the registration, which helps to ensure that any hearing aid shell manufactured using the foregoing process will fit a patient in these important areas.

Figure 8:
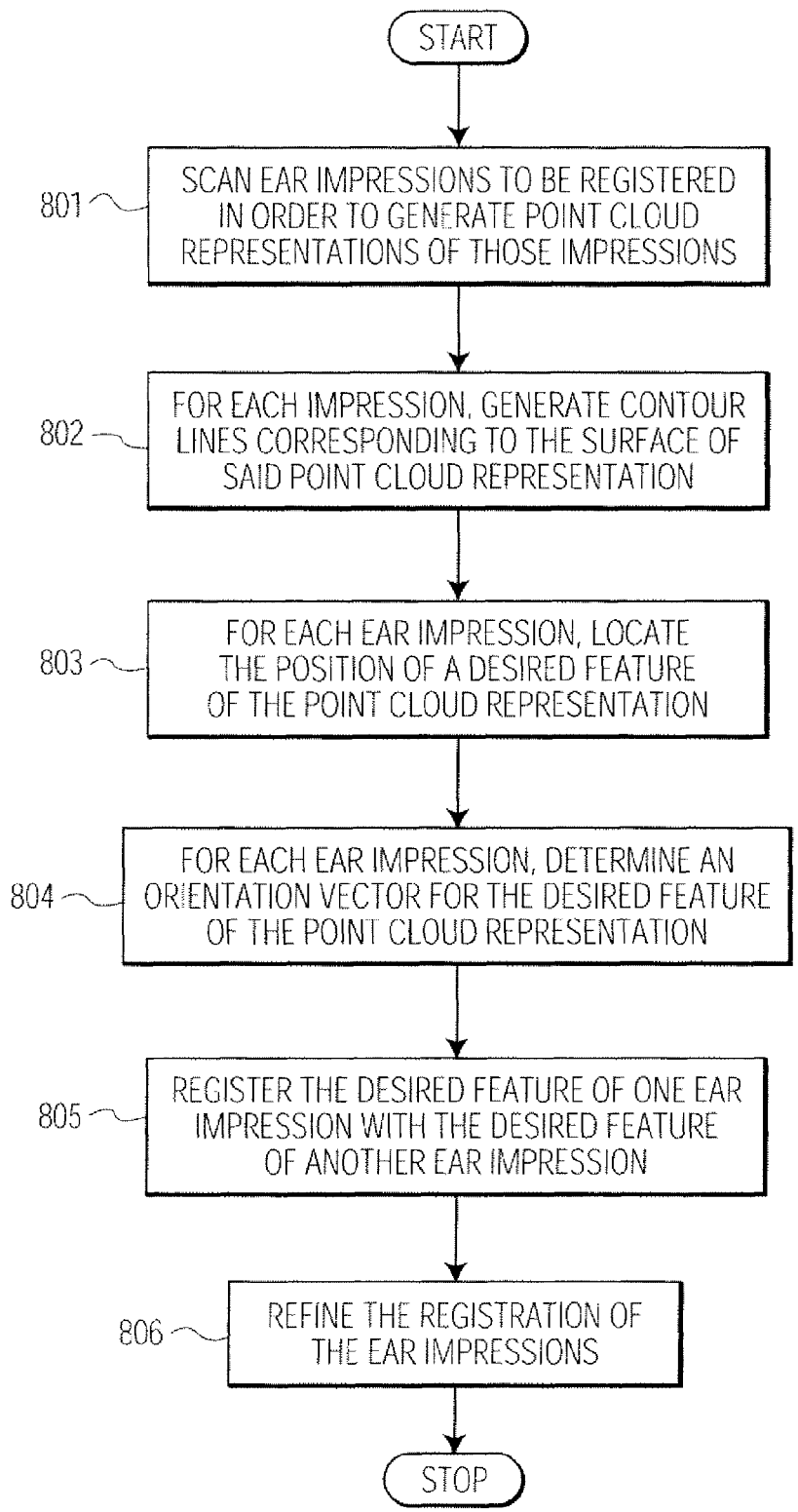
FIG. 8 is a flow chart showing the steps of a method in accordance with an embodiment of the present invention.

FIG. 8 shows a method in accordance with one embodiment of the present invention. Referring to that figure at step 801, ear impressions, such as the ear impressions associated with both ears of a patient, are scanned using, for example, a well-known laser scanning method to generate a point cloud representation of the ear impressions. Then, at step 802, for each ear impression contour lines are generated corresponding to the surface of the point cloud representation. As described herein above, these contour lines may be obtained by positioning the point cloud representation in a desired orientation and then detecting the intersection of the point cloud representation and a plane at different levels along, illustratively, a vertical axis of the point cloud representation. Next, at step 803, the position of a desired feature, for example the aperture, is located for each ear impression and, at step 804, the shape and orientation of the feature of each ear impression are represented by vectors. Once these vectors have been identified for each ear impression then, at step 805, those vectors are used to register the desired feature of both ear impressions. This is accomplished, for example, by determining the three-dimensional components of translation and rotation necessary to align corresponding points of the vector of one point cloud representation of one ear impression with points of the vector of the point cloud representation of the other ear impression. Then, once the alignment of this feature of both ear impressions is completed, at step 806 the registration is refined using, for example, the GCP algorithm described above.

Figure 9:
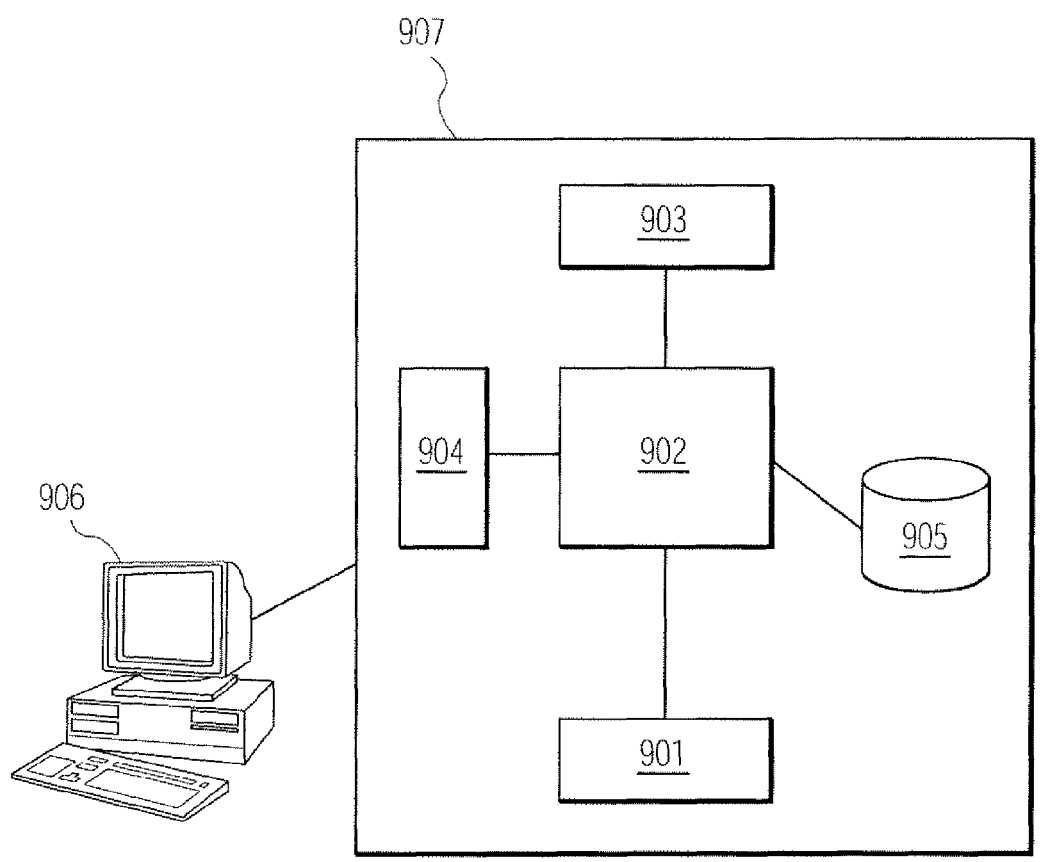
FIG. 9 shows a computer adapted to perform the illustrative steps of the method of FIG. 8 as well as other functions associated with the registration of point cloud representations of ear impressions.

The foregoing embodiments are generally described in terms of manipulating objects, such as lines, planes and three-dimensional shapes associated with ear impression feature identification and ear impression registration. One skilled in the art will recognize that such manipulations may be, in various embodiments, virtual manipulations accomplished in the memory or other circuitry/hardware of an illustrative registration system. Such a registration system may be adapted to perform these manipulations, as well as to perform various methods in accordance with the above-described embodiments, using a programmable computer running software adapted to perform such virtual manipulations and methods. An illustrative programmable computer useful for these purposes is shown in FIG. 9. Referring to that figure, a registration system 907 is implemented on a suitable computer adapted to receive, store and transmit data such as the aforementioned positional information associated with the features of an ear impression. Specifically, illustrative registration system 907 may have, for example, a processor 902 (or multiple processors) which controls the overall operation of the registration system 907. Such operation is defined by computer program instructions stored in a memory 903 and executed by processor 902. The memory 903 may be any type of computer readable medium, including without limitation electronic, magnetic, or optical media. Further, while one memory unit 903 is shown in FIG. 9, it is to be understood that memory unit 903 could comprise multiple memory units, with such memory units comprising any type of memory. Registration system 907 also comprises illustrative modem 901 and network interface 904. Registration system 907 also illustratively comprises a storage medium, such as a computer hard disk drive 905 for storing, for example, data and computer programs adapted for use in accordance with the principles of the present invention as described hereinabove. Finally, registration system 907 also illustratively comprises one or more input/output devices, represented in FIG. 9 as terminal 906, for allowing interaction with, for example, a technician or database administrator. One skilled in the art will recognize that registration system 907 is merely illustrative in nature and that various hardware and software components may be adapted for equally advantageous use in a computer in accordance with the principles of the present invention.

One skilled in the art will also recognize that the software stored in the computer system of FIG. 9 may be adapted to perform various tasks in accordance with the principles of the present invention. In particular, such software may be graphical software adapted to import surface models from anatomical structures, for example those models generated from three-dimensional laser scanning of ear impression mode. In addition, such software may allow for selective editing of those models in a way that allows the identification of contour lines, as described above, or that permits a user to remove or reshape various portions of those anatomical models as described above. The computer system may be adapted to automatically generate points associated with a feature, such as the aperture, of ear impressions so as to create a vector describing the shape and orientation of the feature in three-dimensional space. Such software may also function to automatically register that feature with a corresponding feature on another ear impression by calculating the three dimensional translation and rotation of the vector in order to align one ear impression model with another. The software of a computer-based system such as registration system 907 may also be adapted to perform other functions which will be obvious in light of the teachings herein. All such functions are intended to be contemplated by these teachings.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for detecting an aperture of a graphical representation of an ear impression comprising the steps of:
   determining a first plurality of contour lines on a surface of said graphical representation;
   determining a difference value for each contour line in said first plurality of contour lines, said difference value a function of the difference between a first value of a characteristic of each contour line and a second value of said characteristic of an adjacent contour line; and
   identifying the contour line in said first plurality of contour lines having a greatest value of said difference value.

2. The method of claim 1 wherein said step of determining a first plurality of contour lines comprises:
   orienting said graphical representation in a predetermined orientation in three-dimensional space;
   causing a plane to intersect a surface of said graphical representation at a plurality of levels along an axis; and
   determining where said plane intersects said surface at each level in said plurality of levels.

3. The method of claim 2 further comprising:
   identifying those contour lines in said first plurality of contour lines associated with a portion of said graphical representation.

4. The method of claim 3 wherein said step of identifying those contour lines in said first plurality of contour lines associated with a portion of said graphical representation comprises:
   determining that a second plurality of contour lines are present at a level in said plurality of levels; and
   selecting as said aperture that contour line in said second plurality of contour lines that has a center that is a minimum distance from a center of an adjacent contour line.

5. The method of claim 1 wherein said characteristic is a contour line diameter.

6. The method of claim 1 further comprising:
   applying a weight to each contour line in said plurality of contour lines according to a position of said contour line relative to said graphical representation;
   calculating a contour index for each contour line in said plurality of contour lines as a function of said weight and said difference value; and
   selecting as said aperture a contour line adjacent to said contour line having said greatest value of said contour index.

7. An apparatus for detecting an aperture of a graphical representation of an ear impression comprising:
   means for determining a first plurality of contour lines on a surface of said graphical representation;
   means for determining a difference value for each contour line in said first plurality of contour lines, said difference value a function of the difference between a first value of a characteristic of each contour line and a second value of said characteristic of an adjacent contour line; and
   means for identifying the contour line in said first plurality of contour lines having a greatest value of said difference value.

8. The apparatus of claim 7 wherein said means for determining a first plurality of contour lines comprises:
   means for orienting said graphical representation in a predetermined orientation in three-dimensional space;
   means for causing a plane to intersect a surface of said graphical representation at a plurality of levels along an axis; and
   means for determining where said plane intersects said surface at each level in said plurality of levels.

9. The apparatus of claim 8 further comprising:
   means for identifying those contour lines in said first plurality of contour lines associated with a portion of said graphical representation.

10. The apparatus of claim 9 wherein said means for identifying those contour lines in said first plurality of contour lines associated with a portion of said graphical representation comprises:
    means for determining that a second plurality of contour lines are present at a level in said plurality of levels; and
    means for selecting as said aperture that contour line in said second plurality of contour lines that has a center that is a minimum distance from a center of an adjacent contour line.

11. The apparatus of claim 7 wherein said characteristic is a contour line diameter.

12. The apparatus of claim 7 further comprising:
    means for applying a weight to each contour line in said plurality of contour lines according to a position of said contour line relative to said graphical representation;
    means for calculating a contour index for each contour line in said plurality of contour lines as a function of said weight and said difference value; and
    means for selecting as said aperture a contour line adjacent to said contour line having said greatest value of said contour index.

13. A computer readable non-transitory medium comprising computer program instructions which, when executed by a processor, perform the steps of a method for identifying an aperture of an ear impression, said steps comprising:
    determining a first plurality of contour lines on a surface of said graphical representation;
    determining a difference value for each contour line in said first plurality of contour lines, said difference value a function of the difference between a first value of a characteristic of each contour line and a second value of said characteristic of an adjacent contour line; and
    identifying the contour line in said first plurality of contour lines having a greatest value of said difference value.

14. The computer readable non-transitory medium of claim 13 wherein said computer program instructions defining the step of determining a first plurality of contour lines comprise computer program instructions defining the steps of:
    orienting said graphical representation in a predetermined orientation in three-dimensional space;
    causing a plane to intersect a surface of said graphical representation at a plurality of levels along an axis; and
    determining where said plane intersects said surface at each level in said plurality of levels.

15. The computer readable non-transitory medium of claim 14 further comprising computer program instructions which, when executed by a processor, define the step of:
    identifying those contour lines in said first plurality of contour lines associated with a portion of said graphical representation.

16. The computer readable non-transitory medium of claim 15 wherein said computer program instructions defining the step of identifying those contour lines in said first plurality of contour lines associated with a desired portion of said graphical representation comprise computer program instructions defining the steps of:
    determining that a second plurality of contour lines are present at a level in said plurality of levels; and
    selecting as said aperture that contour line in said second plurality of contour lines that has a center that is a minimum distance from a center of an adjacent contour line.

17. The computer readable non-transitory medium of claim 13 wherein said characteristic is a contour line diameter.

18. The computer readable non-transitory medium of claim 13 further comprising computer program instructions which, when executed by a processor, define the steps of:
   applying a weight to each contour line in said plurality of contour lines according to a position of said contour line relative to said graphical representation;
   calculating a contour index for each contour line in said plurality of contour lines as a function of said weight and said difference value; and
   selecting as said aperture a contour line adjacent to said contour line having said greatest value of said contour index.

* * * * *